United States Patent [19]

Baca et al.

[11] Patent Number: 5,652,742
[45] Date of Patent: Jul. 29, 1997

[54] CARTRIDGE RETENTION IN STORAGE CELL ARRAYS

[75] Inventors: Francisco Antonio Baca; Chi-Hung Dang; Jerry Walter Hammar, all of Tucson, Ariz.

[73] Assignee: International Business Machines Corporation, Armonk, N.Y.

[21] Appl. No.: 537,043

[22] Filed: Sep. 29, 1995

[51] Int. Cl.$^6$ .................. G11B 17/26; G11B 23/023
[52] U.S. Cl. .................. 369/34; 369/36; 369/191; 360/98.04
[58] Field of Search .................. 369/34, 36, 38, 369/39, 178, 180, 191, 192, 179; 414/277, 281, 282, 331; 206/307, 308.1, 308.3, 387.1, 387.15; 360/92, 98.04, 98.06

[56] References Cited

U.S. PATENT DOCUMENTS

| | | |
|---|---|---|
| 1,075,652 | 10/1913 | Kleber, Jr. . |
| 1,738,004 | 12/1929 | Holden . |
| 5,128,912 | 7/1992 | Hug et al. .................. 369/36 |

FOREIGN PATENT DOCUMENTS

| | | | |
|---|---|---|---|
| 490671 | 6/1992 | European Pat. Off. ............ 206/308.1 |
| 63-61482 | 3/1988 | Japan . | |
| 1271962 | 10/1989 | Japan .................. 206/387.15 |
| 3125370 | 5/1991 | Japan .................. 369/192 |
| 5170278 | 7/1993 | Japan .................. 206/308.3 |
| 6139623 | 5/1994 | Japan .................. 206/307 |

*Primary Examiner*—Robert S. Tupper
*Assistant Examiner*—David L. Ometz
*Attorney, Agent, or Firm*—R. M. Sullivan; D. A. Shifrin

[57] ABSTRACT

The present invention provides a retainer system of an automated storage and retrieval system, or library, which prevents information storage elements, or cartridges, from escaping from their respective storage cells when the entire library is transported from one location to another. The retainer system comprises a retractable cable, a null, or dummy, cartridge, and an array of storage cells. One end of the retractable cable is attached to the null cartridge and the other end of the cable is affixed to one end of the array of storage cells. Initially, the null cartridge is positioned in a storage cell located adjacent to the end of the storage array where the cable is affixed. When all the information storage elements are placed inside their respective storage cells within the array, the null cartridge is moved from its original position to a storage cell at the opposite end of the storage array. As the null cartridge is moved, the cable is extended across the front opening of all the intermediate storage cells between the initial storage cell adjacent to the affixed end of the cable and the final storage cell at the opposite end of the storage array. Extending the cable across the front opening of the storage cell holds the information storage element within the storage cell and prevents its escape during the transportation of the library.

17 Claims, 4 Drawing Sheets

CARTRIDGE RETENTION IN STORAGE CELL ARRAYS

FIELD OF THE INVENTION

The present invention relates to automated storage and retrieval systems, also known as automated libraries. More particularly, this invention describes a retainer system for keeping information storage elements, or cartridges, in their storage cells during transportation of the library. The retainer system allows cartridges to be preloaded into the library at the manufacturing location instead of during installation procedure at the customer location. The retainer system prevents cartridges from falling out of their storage cells during shipment of the library to the customer's site.

BACKGROUND OF THE INVENTION

In an automated information storage and retrieval system, also known as an automated library, numerous slots, or storage cells, are arrayed within the library. These storage cells are used to hold information media that are portable or removable from the library, such as magnetic tape cartridges or optical disks. The term "cartridge" used herein refers to any structure for housing such removable information media. Although the present invention is described herein with respect to an optical library storing optical disk cartridges, it is not so limited but is equally applicable, for example, to a library holding magnetic tape cartridges, optical tape cartridges, magnetic disk cartridges or diskettes, or the like. The storage cells typically have an opening in the front to allow the cartridge to be inserted or removed.

A library typically includes a controller, an accessor, a drive, and an Input/Output station. The library controller directs the actions of the other library components. The library controller can also connect to a host processor and respond to control commands from the host processor. The library controller inventories the storage cells noting the identity of each cartridge occupying a storage cell. If no cartridge is situated in a particular storage cell, the library controller records this storage cell as empty. Typically, each cartridge has a unique identifying mark, such as a bar code label, on an edge of the cartridge visible through the cell opening.

The accessor transports a selected cartridge between its origin and its destination. A storage cell, a drive, and the Input/Output station serve as origins and/or destinations. The accessor grips the cartridge with a holding device. The accessor may also be equipped with a vision system, such as a bar code reader, to read the label on a storage cell when the accessor is positioned near the storage cell. During an inventory of the library, such as when a new library has been installed, the vision system scans the cells and reports to the library controller the identity of stored cartridges and their location within the array of storage cells. Alternatively, in a library without a vision system, each cartridge must be loaded into a drive whereby the identifying information is read. The cartridge is then returned to a storage cell. The library controller records the identity and location information in a database. The library controller later refers to and updates this database when a cartridge is moved between an origin and a destination. In this sense, the library controller must "know" the identity of each cartridge and its location within the array of cells in order to be able to retrieve the cartridge for access.

Libraries also have one or more drives to read data from a cartridge or write data to a cartridge. The accessor removes a selected cartridge from a storage cell and inserts it into the drive. Once in the drive, data can be read from the cartridge and sent to the host processor. In some library configurations, the data is sent to the host processor through the library controller, whereas in other library configurations, the data is transferred directly from the drive to the host processor. In this latter configuration, the library controller sends a response to the host processor indicating the selected cartridge is placed in the drive. The host processor then issues a command to the drive to transfer the data. Likewise, data can be written from the host processor to the drive in either library configuration. In both configurations, the library controller directs the accessor to load the selected cartridge into the drive before the data is written to the cartridge.

Libraries also typically include an Input/Output station and an operator panel. The Input/Output station is a port through which a system operator can pass a cartridge to be added to the storage array or through which the accessor can pass a cartridge to the operator for removal from the storage array. The operator panel provides a communication mechanism for an operator to make requests to add cartridges to the library or remove cartridges from the library. The Input/Output station allows the operator to change cartridges in the storage array without requiring the library controller to inventory the entire storage array. Typically, an inventory must be taken each time a library access door is opened by the operator since it is not known whether the operator has added cartridges to the array, has removed cartridges from the library, or has not altered the contents of the library at all. The term library access door refers to a door in the library large enough to allow the operator to manually insert or remove cartridges into the storage cells of the storage array. The library access door does not refer to a door which provides the operator access to the Input/Output station.

When the library needs to be moved from one location to a separate location, the cartridges currently must be removed from their respective storage cells. Otherwise, the cartridges could fall from their storage cells when subjected to the forces of repositioning the library and to the vibrations resulting from the transportation of the library. The risk of falling cartridges occurs from either moving the library a short distance, such as another position within the same room, a medium distance, such as another building within the same site, or a long distance, such as another site.

Furthermore, library manufacturers currently cannot insert cartridges into their respective storage cells at the manufacturing site before shipment to a customer because of the risk that many cartridges would fall from their storage cells during transportation of the library to the customer. Instead, the libraries are shipped to the customers with the storage cells empty of cartridges. The manufacturers must wait until the library has been delivered to the customer and positioned within the customer's facility before inserting the cartridges into the storage cells. Manual insertion of the cartridges becomes part of the library installation procedure at the customer site and lengthens the time before the library becomes available for use by the customer. Thus, library manufacturers would prefer to fill the storage cells of the library with cartridges at the manufacturer's site before shipping the library to the customer to reduce the library installation time at the customer's site.

Additionally, those who own or use libraries face problems when they need to move the library. The risk of cartridges escaping from their respective storage cells when transporting the library forces these owners and users to remove the cartridges before moving the library. To remove the cartridges from the storage cells, an operator must open the library access door. Once the library is moved to its new location, the operator must again open the access door and return the cartridges to the storage cells. Thus, moving the library from one location to another compounds the problem faced by the manufacturer installing the library at the customer's site. In the case of moving the library, the owner/user must both remove the cartridges from the storage cells and then re-insert the cartridges into the storage cells requiring twice the time and effort.

A new inventory must then be taken of the cartridges and their storage cell locations once the library is repositioned in its new location. The new inventory is triggered by the operator opening the library access door to remove the cartridges prior to moving the library. As stated earlier, an inventory of all the storage cells in the library can be a time-consuming task.

Libraries equipped with a vision system on the accessor can perform an inventory of the library more quickly than those libraries not equipped with a vision system. In these libraries, the vision system of the accessor scans all the storage cells in the storage array and reports to the library controller the identity of stored cartridges and their location within the array of storage cells. If a cartridge label cannot be detected or read when the accessor is near a storage cell, that cell is recorded as empty. The vision system may also mistakenly classify a cell as being empty when, in fact, the cell is actually occupied. For example, a cartridge may occupy the cell but have an unreadable label, or even no label. A cartridge may be improperly oriented within the cell or a foreign object may occupy the cell. If the accessor attempts to insert a cartridge into such an occupied cell, an error condition will result causing a time consuming error recovery procedure to be initiated.

One known error procedure attempts to reduce such non-empty errors by directing the accessor's gripper to attempt to reach inside every cell which does not have an identifiable cartridge and verify by "touch" that the cell is actually empty. Any cell which is still not found to be empty is classified in the database as having an "occupied but invalid" status to prevent its use. An inventory of a 400 cell library, for example, can take three or four hours to complete using this procedure.

Libraries not equipped with a vision system must perform an inventory of the library by reading the cartridge identity from the information stored on the cartridge. In these libraries, the accessor transports a cartridge from its storage cell to a drive. The drive reads the identity of the cartridge from the header information stored within the cartridge. The identity of the cartridge and the location of its corresponding storage cell is reported to the library controller. The library controller records the identity and location information in a database. The library controller then signals the accessor to move the inventoried cartridge from the drive to its storage cell within the storage array. The process is then repeated for each storage cell within the storage array.

Accordingly, a retainer system is desired within the library to prevent the cartridges from escaping the storage cells when the library is moved. By holding the cartridges within their respective storage cells, the retainer system enables a library owner/user to move the library from one location to another without removing the cartridges. The library owner/user saves the time it takes to remove the cartridges from the storage cells and the time it takes to re-insert the cartridges into the storage cells. For a large library, this can be a significant delay. A retainer system also enables a library manufacturer to preload the storage cells of the library with cartridges before shipping the library to a customer. Delivering the library loaded with cartridges significantly reduces the time to install the library at the customer site making the library available to the customer much earlier.

In addition, a retainer system that can be engaged without opening the library access door may save the time required to perform an inventory of the library storage arrays. As stated earlier, opening the library access door triggers an inventory of the library storage cells. If the retainer system can be activated to hold the cartridges in their corresponding storage cells without opening the library access door, an inventory is not necessary when the retainer system is later deactivated.

Most libraries, including most optical disk libraries and many magnetic type libraries, need not perform an inventory of the storage array after the library has been powered off and subsequently powered back on. These libraries (hereinafter denoted enhanced libraries) save the inventory information in a memory unaffected by the power loss to the library. One example of these enhanced libraries stores the inventory information in a non-volatile storage contained in the library and accessible by the library controller. When this type of library loses power, the non-volatile storage maintains power through a battery and the inventory information is retained until power to the library is restored. Another example of these enhanced libraries transfers the inventory information to a host processor where the information is stored in a memory in the host processor. The inventory information in the host processor memory is unaffected by a power loss to this type of library.

These enhanced libraries must also determine whether the access door was opened after the library has been powered off. If the library access door is opened during the time the library was powered off, the library must perform an inventory when power is restored. Otherwise, an inventory is not necessary when the library is powered back on. Thus when these enhanced libraries need to be moved, a retainer system that is activated without opening the library access door can save the time required to conduct an inventory of the library storage cells in addition to the time required to remove and re-insert the cartridges within the storage cells.

The retainer system of the present invention accomplishes the two objectives mentioned above. It holds the cartridges within their respective storage cells and prevents their escape therefrom. Further, the retainer system activates the retaining means without requiring the library access door to be opened.

SUMMARY OF THE INVENTION

An object of the present invention is to provide a retainer system for a library which holds cartridges within their corresponding storage cells and preventing the cartridges from escaping the storage cells when the library is moved from one location to another.

Another object of the present invention is to provide a retainer system for a library which can be activated without opening the library access door thereby avoiding an inventory of all the storage cells within the library.

These and other objects are achieved in the retainer system of the present invention which holds information storage elements, or cartridges, in their respective storage cells. This retainer system allows a library to be moved from one location to another without emptying the information storage elements from their storage cells. The retainer system of the present invention uses an array of storage cells, a null cartridge, and a retractable cable. When the cable is fully retracted, information storage elements can be inserted or removed from the storage cells of the array. When the cable is fully extended across the front opening of each storage cell within the array, the information storage elements are prevented from escaping the storage cells.

A first embodiment of the invention uses a spool assembly mounted at one end of the array of storage cells. One end of the cable is affixed to the spool assembly and the other end of the cable is attached to the null cartridge. When the cable is fully wound upon the spool assembly, the null cartridge resides in the storage cell adjacent to the end of the array where the spool assembly is mounted. When the cable is fully extended, the null cartridge has been moved to the storage cell at the opposite end of the array.

A second embodiment of the invention uses a spool positioned inside the null cartridge. One end of the cable is affixed to one end of the array of storage cells and the other end of the cable is attached to the spool within the null cartridge. When the cable is fully wound upon the spool, the null cartridge resides in the storage cell adjacent to the end of the array where the cable is affixed. When the cable is fully extended, the null cartridge has been moved to the storage cell at the opposite end of the array.

The null cartridge is a cartridge which contains no internal storage medium for storing information. Its main purpose is to extend and retract the cable across the front openings of the storage cells. When the retainer system is inactive, the null cartridge resides in the storage cell adjacent to the end of the array where the cable is affixed. The cable is retracted. Information storage elements can be inserted or removed from their respective storage cells. To activate the retainer system, the null cartridge is moved from the storage cell at one end of the array to the storage cell at the opposite end of the array. Moving the null cartridge extends the cable across the front opening of all intermediate storage cells between the ends of the array. The cable holds the information storage elements within their corresponding storage cells.

To deactivate the retainer system, the null cartridge is returned to its original storage cell. The original storage cell is located adjacent to the end of the storage array where the cable is affixed. Moving the null cartridge to this first storage cell retracts the cable leaving the front openings of the intermediate storage cells unobstructed. Information storage elements can again be removed or inserted from these storage cells. The null cartridge can be moved either manually by an operator through the library access door or automatically using the accessor within the library.

The foregoing and other features and advantages of the invention will be apparent from the following more particular description of preferred embodiments of the invention, as illustrated in the accompanying drawings.

DETAILED DESCRIPTION OF THE INVENTION

Figure 1:
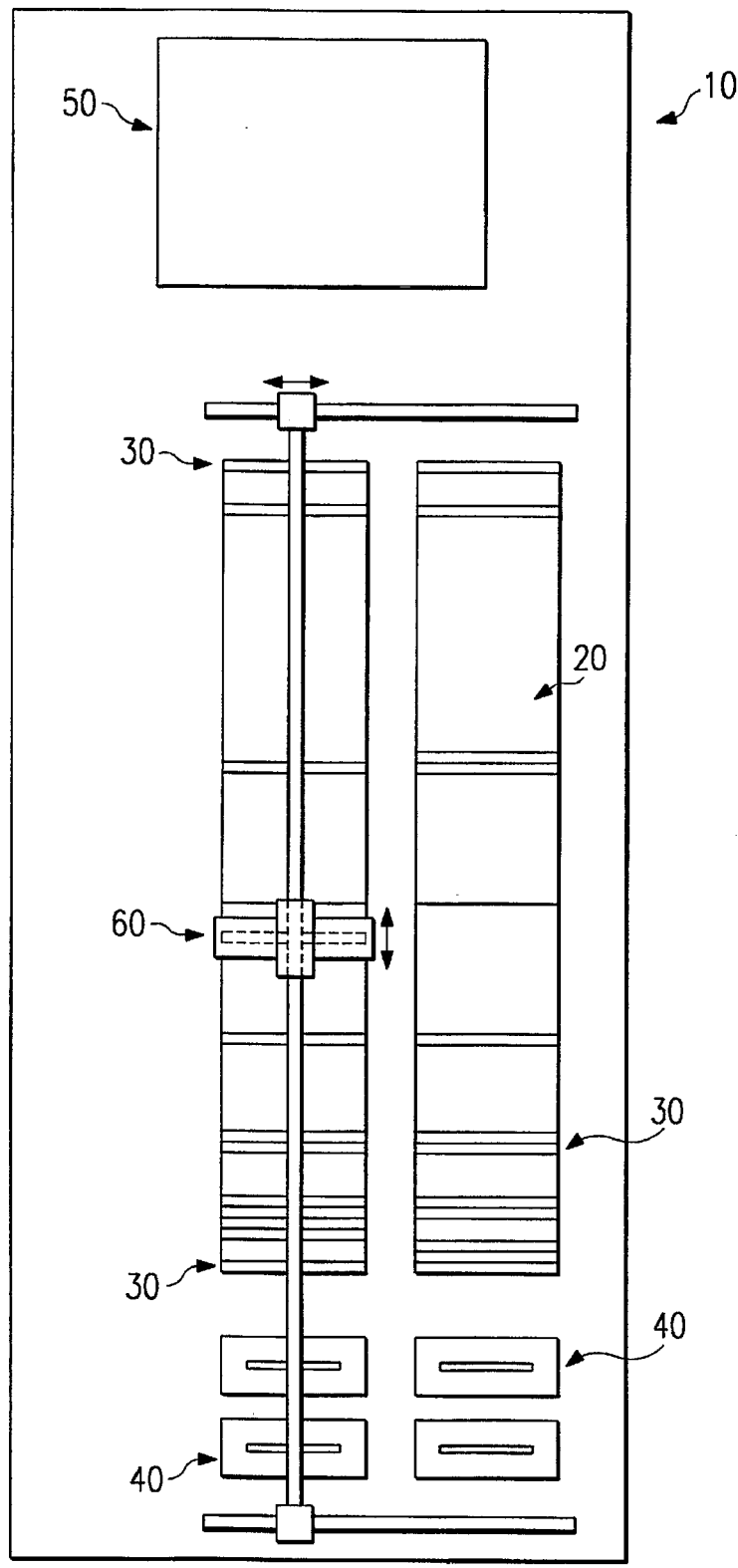
FIG. 1 is a front view of an optical disk library with the front, rear, and side panels removed.

FIG. 1 illustrates an automated storage and retrieval system, or library, 10 for optical disk cartridges with front, rear, and side panels removed to show the interior of the library 10. The library 10 includes an array of storage cells 20 for holding optical disk cartridges 30. The array of storage cells 20 is arranged in rows and columns on an interior wall of the library 10. An accessor 60 transports a selected cartridge 20 between a storage cell 30 and a tape drive unit 40. The accessor 60 includes a gripper for holding the cartridge. The accessor 60 is capable of motion in the X and Y axes. The accessor's 60 gripper provides motion in the Z direction and need not pivot to insert and remove cartridges from the optical disk drives 40, or the storage cells 30 in the storage array.

The library 10 contains an optical disk drive 40 for reading data from or writing data to a cartridge 20. Typically, a library 10 includes more than one optical disk drive 40 and four are shown in FIG. 1. The library 10 also contains a library controller 50 located in the upper portion of the library 10. The library controller 50 uses a microprocessor with control instructions in its control storage to direct the operation of the accessor 60 and the drives 40. The library controller 50 also interfaces with a host processor (not shown) and controls the transfer of data between the host processor and the drive 40.

Cartridges 30 are manually loaded into the storage cells of the storage array 20 by an operator who accesses the library 10 through a locking library access door (not shown). An operator may unlock and open the library access door to remove cartridges 30 from their storage cells 20, insert cartridges 30 into unoccupied storage cells 20, or service the accessor 60, the disk drives 40, the library controller 50, or their interconnections. After the library access door is closed and locked, the library controller 50 must perform an inventory of the storage array 20 noting the identity of the cartridges 30 in their respective storage cells 20. The manual loading of tape cartridges is typically done during the installation of a new library.

Figure 2:
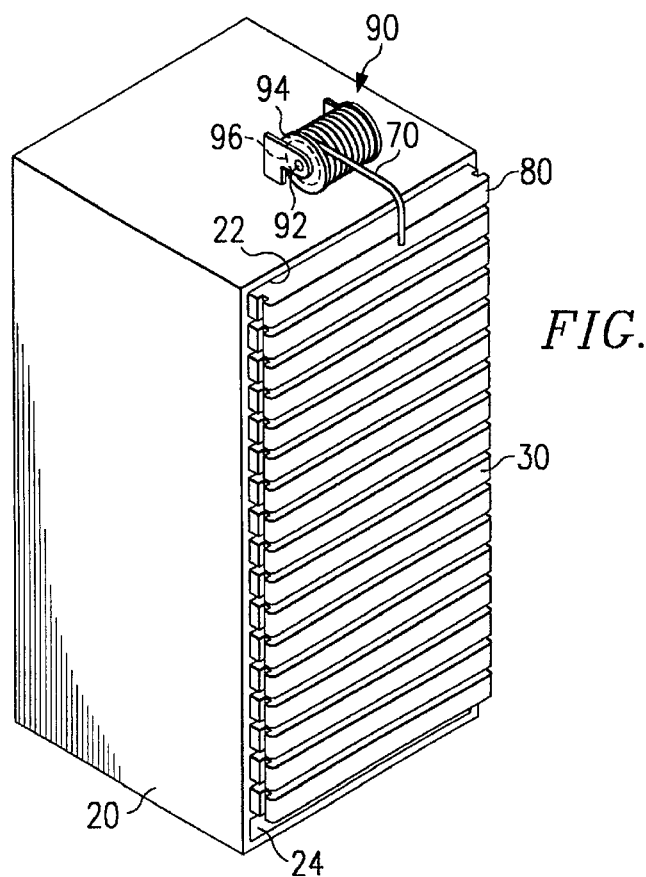
FIG. 2 is an orthogonal view of a first embodiment of a retainer system for a library showing the spool assembly mounted to the top of the storage array and the cable retracted from the front openings of the storage cells within a storage array.
Figure 3:
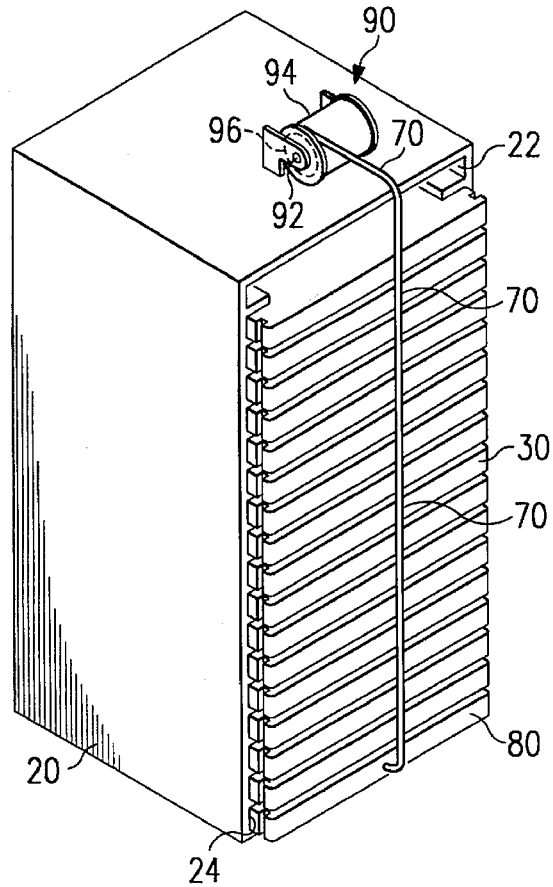
FIG. 3 is an orthogonal view of the retainer system of FIG. 2 showing the cable extended across the front openings of the storage cells within a storage array.

FIG. 2 and FIG. 3 show a retainer system for a library which uses a retractable cable 70 to hold information storage elements 30, or cartridges, in their respective storage cells 20. The retainer system further consists of a first storage cell 22 at one end of an array of storage cells 20, a second storage cell 24 at the opposite end of the storage array 20, and a null cartridge 80. A spool assembly 90 is mounted atop the storage array 20 adjacent to the first storage cell 22. The spool assembly contains a spool 94 rotating on a shaft 92. One end of the cable 70 is attached to the spool 94. As the cable 70 is extended, the spool 94 rotates about the shaft 92. A clock spring 96 is positioned between the shaft 92 and the spool 94. The clock spring 96 provides tension along the cable 70 as the cable 70 is extended and the spool 94 rotates. The tension along the cable 70 allows the cable 70 to be retracted.

The opposite end of the cable 70 is attached to the null cartridge 80. The null cartridge is a replica of an information storage element 30 and thus fits into a storage cell 20 of the storage array. However, the null cartridge 80 cannot store information since it does not contain a storage medium within the cartridge shell. The null cartridge 80 is used to extend and retract the cable 70.

In FIG. 2, the null cartridge 80 is positioned in the first storage cell 22 of the storage array 20. With the null cartridge 80 in this position, the retainer system is deactivated. The cable 70 is retracted and wound around the spool 94. The front openings of the storage cells 20 are not obstructed by the cable 70. Information storage elements 30 can be inserted into or removed from the storage cells 20 within the storage array.

In FIG. 3, the retainer system has been activated. The null cartridge 70 has been moved to the last storage cell 24 at the end of the storage array 20 opposite to where the spool assembly 90 is mounted. Moving the null cartridge 80 to this position extends the cable 70 from the spool 94 across the front openings of the storage cells 20 within the storage array. The cable 70 holds the information storage elements 30 within their respective storage cells 20. Thus, when activated, the retainer system prevents the information storage elements 30 from escaping their storage cells 20.

Figure 4:
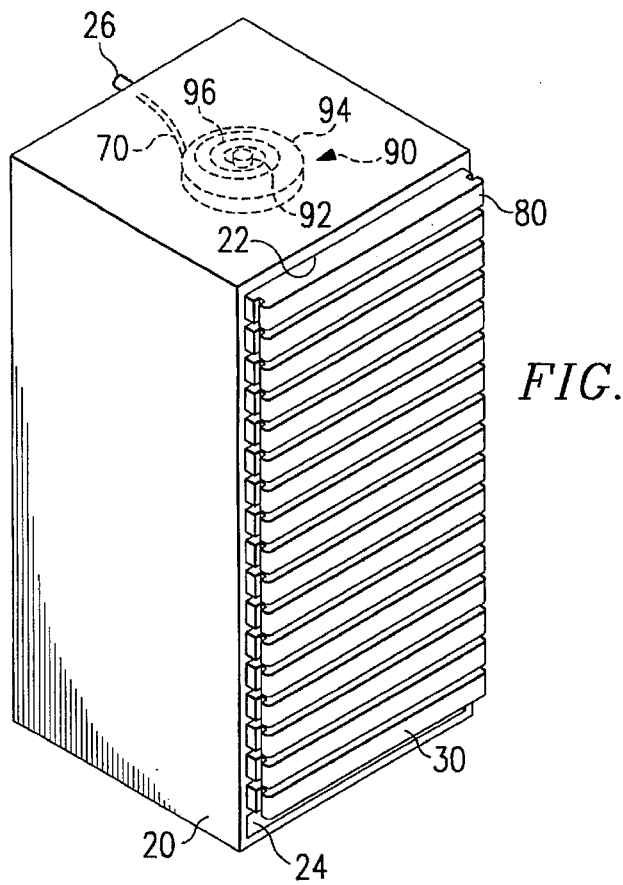
FIG. 4 is an orthogonal view of a second embodiment of a retainer system for a library showing the spool positioned inside the null cartridge and the cable retracted from the front openings of the storage cells within a storage array.
Figure 5:
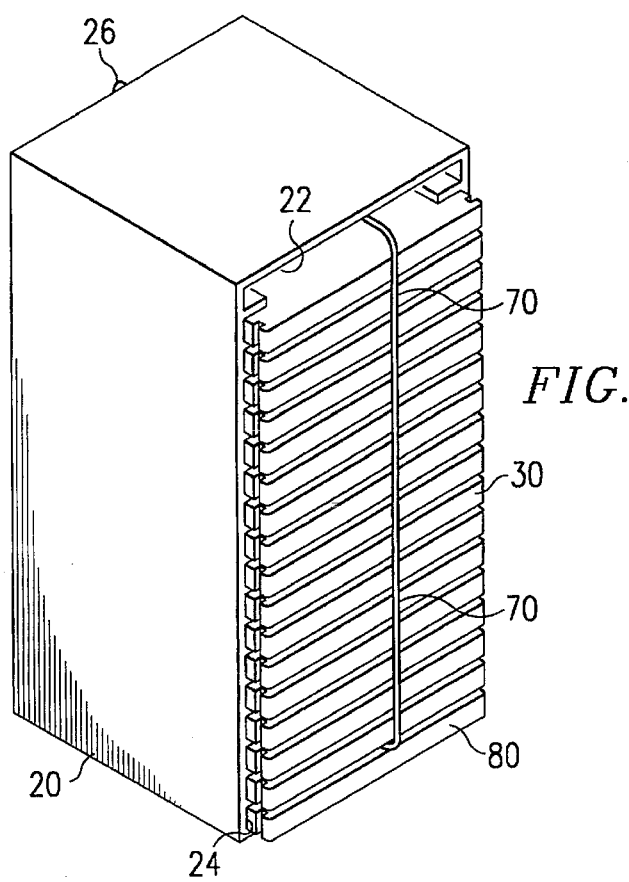
FIG. 5 is an orthogonal view of the retainer system of FIG. 4 showing the cable extended across the front openings of the storage cells within a storage array.

FIG. 4 and FIG. 5 show an alternate retainer system for a library which uses a retractable cable 70 to hold information storage elements 30, or cartridges, in their respective storage cells 20. This retainer system also consists of a first storage cell 22 at one end of an array of storage cells 20, a second storage cell 24 at the opposite end of the storage array 20, and a null cartridge 80. A spool assembly 90 is mounted within the null cartridge 80. The spool assembly contains a spool 94 rotating on a shaft 92. One end of the cable 70 is attached to the spool 94. As the cable 70 is extended, the spool 94 rotates about the shaft 92. A clock spring 96 is positioned between the shaft 92 and the spool 94. The clock spring 96 provides tension along the cable 70 as the cable 70 is extended and the spool 94 rotates. The tension along the cable 70 allows the cable 70 to be retracted.

The opposite end of the cable 70 is affixed to one end of the storage array 26 adjacent to the first storage cell 22. As stated before, the null cartridge is a replica of an information storage element 30 and thus fits into a storage cell 20 of the storage array. However, the null cartridge 80 cannot store information since it does not contain a storage medium within the cartridge shell. The null cartridge 80 is used to extend and retract the cable 70.

In FIG. 4, the null cartridge 80 is positioned in the first storage cell 22 of the storage array 20. With the null cartridge 80 in this position, the retainer system is deactivated. The cable 70 is retracted and wound around the spool 94 within the null cartridge 80. The front openings of the storage cells 20 are not obstructed by the cable 70. Information storage elements 30 can be inserted into or removed from the storage cells 20 within the storage array.

In FIG. 5, the retainer system has been activated. The null cartridge 70 has been moved to the last storage cell 24 at the end of the storage array 20 opposite to where the cable 70 is affixed. Moving the null cartridge 80 to this position extends the cable 70 across the front openings of the storage cells 20 within the storage array. The cable 70 holds the information storage elements 30 within their respective storage cells 20. Thus, when activated, the retainer system prevents the information storage elements 30 from escaping their storage cells 20.

In both of the retainer systems discussed in FIGS. 2 and 3 and FIGS. 4 and 5, moving the null cartridge 80 from the first storage cell 22 to the last storage cell 24 activates the retainer system. In turn, moving the null cartridge 80 from the last storage cell 24 to the first storage cell 22 deactivates the retainer system. The null cartridge 80 in either of these retainer systems can be moved manually by an operator after the library access door has been opened. In addition, the null cartridge 80 can also be moved automatically using the accessor 60 of the library 10. In this latter case, the library access door need not be opened to activate the retainer system. Thus, the library controller 50 is not required to perform an inventory of the all the storage cells 20 of the library 10 to record the identity and location of the information storage elements 30 after the retainer system is subsequently deactivated.

Figure 6:
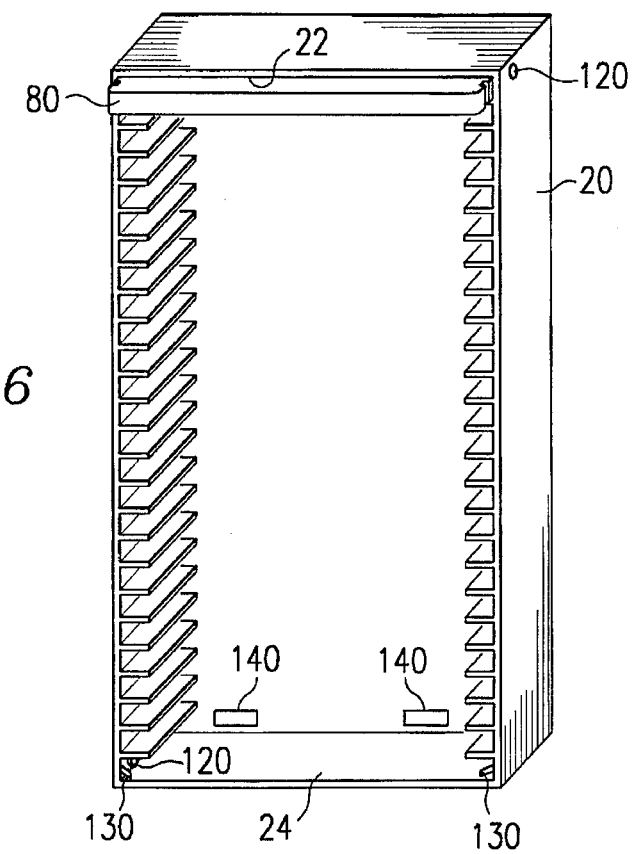
FIG. 6 is a front view of a retainer system for a library showing retainer system sensors, pawl latches, and a magnet.

FIG. 6 shows a storage array 20 containing only the null cartridge 80 and empty of information storage elements 30. The null cartridge 80 is positioned such that the retaining system is inactive. The cable 70 is fully retracted within the null cartridge 80. Sensors 120 are positioned in the first storage cell 22 and the last storage cell 24 in the storage array 20. The sensors 120 determine whether the null cartridge 80 is placed in the first 22 or last storage cell 24. When the sensors 120 detect that the null cartridge 80 is located in the first storage cell 22, the retainer system is inactive. The library controller 50 can direct the accessor 60 to retrieve any cartridge 30 within the storage array 20. Likewise, when the sensors 120 detect that the null cartridge 80 is located in the last storage cell 24, the retainer system is active. The sensors 120 notify the library controller 50 that the accessor 60 cannot retrieve cartridges 30 from the storage array 20.

Latches 130 are also fastened to the last storage cell 24 in the storage array 20. The latches 130 engage to prevent the null cartridge 80 from escaping the last storage cell 24. When the accessor 60 retrieves the null cartridge, the gripper within the accessor 60 disengages the latches 130 and the null cartridge 80 can be removed from the last storage cell 24.

Alternatively, a magnet 140 is located on the rear wall opposite to the front opening of the last storage cell 24. The magnet 140 provides additional force to hold the null cartridge 80 within the last storage cell 24 when the retainer system is activated. A metal plate is added to the null cartridge 80 such that it aligns with the magnet 140 when the null cartridge 80 is inserted into the last storage cell 24. The magnet 140 and the metal plate form a bond that prevents the null cartridge 80 from vibrating loose of the last storage cell 24 when the library 10 moved. However, the bond can be overcome by the accessor 60 when it removes the null cartridge 80 from the last storage cell 24.

Figure 7:
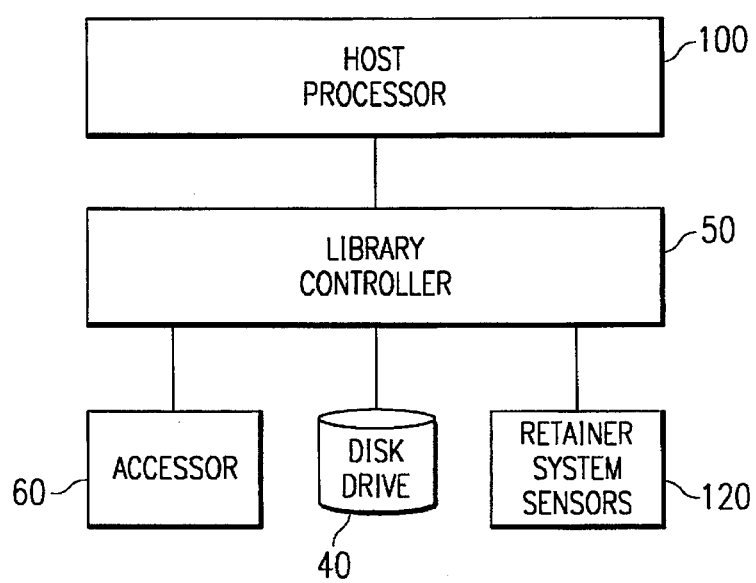
FIG. 7 is a block diagram of an optical disk library showing the configuration of the major components.

FIG. 7 shows a high level block diagram of the library 10 shown in FIG. 1. Each block represents a major component of the library 10. The connections of the blocks represents the configuration of the library. A host processor 100 is connected to the library controller 50. The library controller 50 connects to the accessor 30, the optical disk drives 40, and the retainer system sensors 120.

The retainer system of the present invention can be used with libraries having other configurations than the one just described in FIGS. 1 and 7. The description of the library illustrated in FIGS. 1 and 7 is not meant to be limiting.

While the invention has been particularly shown and described with reference to preferred embodiments thereof, it will be understood by those skilled in the art that various changes in form and details may be made therein without departing from the spirit and scope of the invention. For example, the retainer system of the present invention has been described using a retractable cable vertically extending across the front openings of storage cell that are horizontally situated. However, the retainer system could also use a retractable cable which horizontally extends across the front openings of storage cells that are vertically situated.

What is claimed is:

1. In an automated storage and retrieval system for information storage elements, said automated storage and retrieval system having an array of storage cells having a first and second end, each said storage cell having a front opening through which an information storage element is inserted and removed, said automated storage and retrieval system further having a drive for reading information from said information storage element, and an accessor for transporting said information storage element between said storage cells and said drive, a retainer system for preventing said information storage element from escaping said storage cell during transport of said automated storage and retrieval system, said retainer system comprising:

a first storage cell having said front opening and coinciding with said first end of said array of storage cells;

a second storage cell separated from said first storage cell by a plurality of intermediate storage cells, said second storage cell having said front opening and coinciding with said second end of said array of storage cells;

a null cartridge; and a retractable cable having a first end affixed to said first end of said array of storage cells and a second end affixed to said null cartridge, wherein, as said null cartridge initially residing in said first storage cell is transported to said second storage cell, said cable is extended across said front opening of each said intermediate storage cell, said cable preventing each said information storage element residing within each said intermediate storage cell from escaping therefrom.

2. The retainer system of claim 1 further comprising a spool assembly for retracting and extending said cable, said spool assembly comprising:

a shaft mounted to said first end of said array of storage cells;

a spool rotating on said shaft, said first end of said cable affixed to said spool, said cable wound around said spool when said cable is fully retracted and said cable unwinding from said spool as said cable is extended; and a clock spring fastened between said shaft and said spool to provide tension in response to said spool rotating, said spool rotating as said cable is unwound.

3. The retainer system of claim 1 further comprising a spool assembly for retracting and extending said cable, said spool assembly comprising:

a shaft mounted within said null cartridge;

a spool rotating on said shaft, said second end of said cable affixed to said spool, said first end of said cable affixed to a rear partition of said first storage cell, said cable wound around said spool when said cable is fully retracted and said cable unwinding from said spool as said cable is extended; and a clock spring fastened between said shaft and said spool to provide tension in response to said spool rotating, said spool rotating as said cable is unwound.

4. The retainer system of claim 1 further comprising a latch attached to said second end of said array of storage cells to secure said null cartridge within said second storage cell when said null cartridge is inserted into said second storage cell.

5. The retainer system of claim 1 further comprising:

a metal plate attached to said null cartridge; and a magnet affixed within said second storage cell to secure said null cartridge within said second storage cell, said magnet positioned within said second storage cell such that said magnet is aligned with said metal plate attached to said null cartridge when said null cartridge is inserted into said second storage cell.

6. The retainer system of claim 1 further comprising:

a sensor for determining when said cable is extended across each said front opening of each said storage cell of said array of storage cells.

7. The retainer system of claim 6 wherein said sensor is positioned within said second storage cell, said sensor determining that said cable is extended across each said front opening of each said storage cell of said array of storage cells when said null cartridge is inserted into said second storage cell.

8. The retainer system of claim 6 wherein said sensor is positioned within said first storage cell, said sensor determining that said cable is extended across each said front opening of each said storage cell of said array of storage cells when said null cartridge is removed from said first storage cell.

9. An automated storage and retrieval system comprising:

an array of storage cells having a first and a second end, each said storage cell having a front opening for inserting and removing an information storage element;

a drive for reading information from said information storage element;

an accessor for transporting said information storage element between said storage cells and said drive;

a controller interconnected to said accessor, said drive, and a host processor, said controller receiving control instructions from said host processor and directing actions to said accessor and said drive in response to said control instructions; and a retainer system for preventing said information storage element from escaping said storage cell when said automated storage and retrieval system is transported from a first location to a second location, said retainer system comprising:

a first storage cell having said front opening and coinciding with said first end of said array of storage cells;

a second storage cell separated from said first storage cell by a plurality of intermediate storage cells, said second storage cell having said front opening and coinciding with said second end of said array of storage cells;

a null cartridge; and a retractable cable having a first end affixed to said first end of said array of storage cells and a second end affixed to said null cartridge.

10. The automated storage and retrieval system in claim 9 wherein, as said null cartridge initially residing in said first storage cell is transported to said second storage cell, said cable is extended across said front opening of each said intermediate storage cell, said cable preventing each said information storage element residing within each said intermediate storage cell from escaping therefrom.

11. The automated storage and retrieval system of claim 10 wherein said retainer system further comprises a spool assembly for retracting and extending said cable, said spool assembly comprising:

a shaft mounted to said first end of said array of storage cells;

a spool rotating on said shaft, said first end of said cable affixed to said spool, said cable wound around said spool when said cable is fully retracted and said cable unwinding from said spool as said cable is extended; and a clock spring fastened between said shaft and said spool to provide tension in response to said spool rotating, said spool rotating as said cable is unwound.

12. The automated storage and retrieval system of claim 10 wherein said retainer system further comprises a spool assembly for retracting and extending said cable, said spool assembly comprising:

a shaft mounted within said null cartridge;

a spool rotating on said shaft, said second end of said cable affixed to said spool, said first end of said cable affixed to a rear partition of said first storage cell, said cable wound around said spool when said cable is fully retracted and said cable unwinding from said spool as said cable is extended; and a clock spring fastened between said shaft and said spool to provide tension in response to said spool rotating, said spool rotating as said cable is unwound.

13. The automated storage and retrieval system of claim 10 wherein said retainer system further comprises a latch attached to said second end of said array of storage cells to secure said null cartridge within said second storage cell when said null cartridge is inserted into said second storage cell.

14. The automated storage and retrieval system of claim 10 wherein said retainer system further comprises:

a metal plate attached to said null cartridge; and a magnet affixed within said second storage cell to secure said null cartridge within said second storage cell, said magnet positioned within said second storage cell such that said magnet is aligned with said metal plate attached to said null cartridge when said null cartridge is inserted into said second storage cell.

15. The automated storage and retrieval system of claim 10 wherein said retainer system further comprises a sensor for determining when said cable is extended across each said front opening of each said storage cell of said array of storage cells.

16. The automated storage and retrieval system of claim 15 wherein said sensor is positioned within said second storage cell, said sensor determining that said cable is extended across each said front opening of each said storage cell of said array of storage cells when said null cartridge is inserted into said second storage cell.

17. The automated storage and retrieval system of claim 15 wherein said sensor is positioned within said first storage cell, said sensor determining that said cable is extended across each said front opening of each said storage cell of said array of storage cells when said null cartridge is removed from said first storage cell.

* * * * *